(12) United States Patent
Banks et al.

(10) Patent No.: US 10,437,082 B2
(45) Date of Patent: Oct. 8, 2019

(54) WIDE FIELD OF VIEW ELECTRO-OPTIC MODULATOR AND METHODS AND SYSTEMS OF MANUFACTURING AND USING SAME

(71) Applicant: TetraVue, Inc., Vista, CA (US)

(72) Inventors: Paul S. Banks, San Marcos, CA (US); Bodo Schmidt, Carlsbad, CA (US); Charles Stewart Tuvey, San Diego, CA (US); Christopher Allen Ebbers, Livermore, CA (US)

(73) Assignee: TetraVue, Inc., Vista, CA (US)

( * ) Notice: Subject to any disclaimer, the term of this patent is extended or adjusted under 35 U.S.C. 154(b) by 0 days.

(21) Appl. No.: 15/857,263

(22) Filed: Dec. 28, 2017

(65) Prior Publication Data

US 2019/0204628 A1    Jul. 4, 2019

(51) Int. Cl.
*G02F 1/01* (2006.01)
*G02F 1/03* (2006.01)

(52) U.S. Cl.
CPC .......... *G02F 1/0136* (2013.01); *G02F 1/0322* (2013.01); *G02F 2202/20* (2013.01); *G02F 2203/07* (2013.01)

(58) Field of Classification Search
CPC .. G02F 1/0136; G02F 1/0322; G02F 2202/20; G02F 2203/07
USPC ................ 359/250, 246, 245, 240, 238, 237
See application file for complete search history.

(56) References Cited

U.S. PATENT DOCUMENTS

| | | | |
|---|---|---|---|
| 3,304,428 | A | 2/1967 | Peters |
| 3,325,646 | A | 6/1967 | Reichel et al. |
| 3,402,002 | A | 9/1968 | Eden |
| 3,414,728 | A | 12/1968 | Patel |

(Continued)

FOREIGN PATENT DOCUMENTS

| | | |
|---|---|---|
| CN | 101216616 A | 7/2008 |
| KR | 100480746 B1 | 11/1999 |

(Continued)

OTHER PUBLICATIONS

O. Kishkovich, PCT Search Report and Written Opinion in counterpart PCT application PCT/US2018/067523, Jun. 13, 2019, 9 pages.

(Continued)

*Primary Examiner* — Tuyen Tra
(74) *Attorney, Agent, or Firm* — Gavrilovic, Dodd & Lindsey, LLP (57) ABSTRACT

An electro-optic modulator (EOM) includes a first electro-optic (EO) material configured to receive light. The first EO material has an optic axis that is not parallel to the optical axis of the EOM. The optic axis indicates the direction through the first EO material along which a ray of light passing through the first EO material experiences no birefringence. The EOM also includes a polarization rotator that receives light output from the first EO material. The rotated light passes through a second EO material. The second EO material is positioned in the EOM such that its optic axis is not parallel to the optical axis of the EOM. The second EO material compensates for the birefringence and/or higher-order optical effects of the first material, thus reducing optical transmission errors of the EOM. The EOM may provide a wider field of view for imaging systems.

28 Claims, 5 Drawing Sheets

(56) References Cited

U.S. PATENT DOCUMENTS

| | | | |
|---|---|---|---|
| 4,998,255 A | | 3/1991 | Gerstenberger et al. |
| 6,914,999 B2 | | 7/2005 | Breukelaar et al. |
| 7,079,320 B2 | | 7/2006 | Kewitsch |
| 9,024,247 B2 | | 5/2015 | Zanger |
| 9,574,933 B2 | | 2/2017 | Kondo et al. |
| 2002/0181067 A1 | * | 12/2002 | Romanovsky ........ G02F 1/0551 359/245 |
| 2009/0059343 A1 | | 3/2009 | Levinton |
| 2009/0219378 A1 | * | 9/2009 | Nakamura ................ G02F 1/03 347/255 |
| 2017/0269387 A1 | * | 9/2017 | Sakai .................... G02F 1/0102 |

FOREIGN PATENT DOCUMENTS

| | | |
|---|---|---|
| KR | 101382890 B1 | 12/2013 |
| WO | 1999030203 A1 | 6/1999 |
| WO | 2000006812 A1 | 2/2000 |
| WO | 2010130281 A1 | 11/2010 |

OTHER PUBLICATIONS

Yang Li et al., Optical and Electrooptic Properties of Potassium Lithium Tantalate Niobate Single Crystals, Proceeding of SPIE, vol. 8120, 2011, 2 page.

J.A. Valdmanis, Measurement of High-Speed Signals in Solid State Devices, Semiconductor Materials, vol. 28, Academic Press, Inc., 1990, p. 146 (3 pages).

* cited by examiner

WIDE FIELD OF VIEW ELECTRO-OPTIC MODULATOR AND METHODS AND SYSTEMS OF MANUFACTURING AND USING SAME

TECHNICAL FIELD

This disclosure relates generally to electro-optic modulators, more particularly, to electro-optic modulators suitable for processing incoming light having a relatively large angle of incidence.

BACKGROUND

Kerr cells and Pockels cells are particular types of electro-optic modulators (EOMs) that can modulate the polarization of light incident on them. In an EOM, an electric field is applied to a material that changes properties under the influence of the electric field. The EOM's change in properties modifies the phase of light transmitted therethrough. Pockels cells are based on the Pockels effect, in which a material's refractive index changes linearly with applied electric field. Kerr cells are based on the Kerr effect, in which a material's refractive index varies quadratically with the applied electric field. For certain materials and certain orientations of the applied electric field, the Pockels effect creates an anisotropy in the refractive index of the material. Such materials and fields may be used to create a Pockels cell, in which the induced anisotropy changes the polarization state of light transmitted therethrough linearly as a function of applied voltage. EOMs such as Pockels cells may be placed between crossed polarizers to modulate the intensity of light. The temporal response of a Pockels cell may in some circumstances be less than 1 nanosecond, enabling its use as a fast optical shutter.

Although widely used for laser applications, Pockels cells traditionally have been viewed as having significant limitations, rendering such devices unsuitable for optical processing in other types of applications. Pockels cell materials have birefringence (different values of the refractive index for light polarized along different axes of the crystal structure), which restricts the angular acceptance of incoming light to the cell. Some known Pockels cells may only effectively modulate incident light deviating by less than few degrees from the surface normal of the Pockels cell, significantly limiting their use in such applications. For example, the paper "Extending the field of view of KD*P electrooptic modulators," by Edward West, Applied Optics, Vol. 17 No. 18, pp. 3010-3013, September 1978 ("West paper"), discusses using compensation techniques to achieve larger acceptance angles for Pockels cells. However, the paper also describes how the compensation techniques have a small impact on the acceptance angle when voltage is applied to the Pockels cell during operation. Thus, the compensation techniques of the West paper are not entirely useful for wide acceptance angle applications, such as imaging, where incident light may hit a Pockels cell at larger range of incident angles.

SUMMARY

To address the foregoing shortcomings, disclosed herein are improved electro-optic modulators (EOMs) that substantially increase the acceptance angle of incident light.

A first disclosed EOM includes a first electro-optic material configured to receive light. The first electro-optic material has an optic axis that is not parallel to the optical axis of the EOM. The optic axis indicates the direction through the first electro-optic material along which a ray of light passing through the first electro-optic material experiences no birefringence. The first electro-optic material is positioned within the EOM so that its optic axis is not aligned parallel to the optical axis of the EOM. The polarization state of the light output from the first electro-optic material is changed. This is accomplished by a means for changing the polarization state of the light output from the first electro-optic material. The changed light then passes through a second electro-optic material. The second electro-optic material is positioned in the EOM such that its optic axis is not parallel to the optical axis of the EOM. The optic axis of the second material indicates the direction through the second material along which a ray of light passing through the second material experiences no birefringence. In operation, the second material compensates for the birefringence and/or higher-order optical effects of the first material to reduce optical transmission errors of the EOM and thereby increasing in angle of acceptance for incoming light.

Another disclosed EOM includes two electro-optic material pairs. This EOM includes a first electro-optic material configured to receive light. The first electro-optic material has an optic axis that is not parallel to the optical axis of the EOM. The optic axis indicates the direction through the first electro-optic material along which a ray of light passing through the first material experiences no birefringence. The first electro-optic material is positioned within the EOM so that its optic axis is not aligned parallel to the optical axis of the EOM. The polarization state of the light output from the first electro-optic material is changed. This is accomplished by a means for changing the polarization state of the light output from the first electro-optic material. The changed light then passes through a second electro-optic material. The second electro-optic material is positioned in the EOM such that its optic axis is not parallel to the optical axis of the EOM. The optic axis of the second material indicates the direction through the second material along which a ray of light passing through the second material experiences no birefringence. In operation, the second material compensates for the birefringence and/or higher-order optical effects of the first material to reduce optical transmission errors of the EOM, thereby increasing in angle of acceptance for incoming light. This EOM also includes a third electro-optic material configured to receive light output from the second electro-optic material. The third electro-optic material has an optic axis indicating a direction through the third electro-optic material along which a ray of light passing through the third electro-optic material experiences no birefringence. The third electro-optic material is positioned within the modulator so that its optic axis is not parallel to the optical axis of the modulator. The polarization state of the light output from the third electro-optic material is changed. This is accomplished by a means for changing the polarization state of the light output from the third electro-optic material. The changed light then passes through a fourth electro-optic material. The fourth electro-optic material has an optic axis indicating a direction through the fourth electro-optic material along which a ray of light passing through the fourth electro-optic material experiences no birefringence. The fourth electro-optic material is positioned within the EOM so that its optic axis is not parallel to the optical axis of the modulator. In operation, the fourth material compensates for the birefringence and/or higher-order optical effects of the third material to reduce optical transmission errors, thereby increasing in angle of acceptance for incoming light.

An additionally disclosed EOM includes more than two electro-optic material pairs oriented and configured relative to one another in a manner similar to that described above.

The foregoing summary does not define the limits of the appended claims. Other aspects, embodiments, features, and advantages will be or will become apparent to one with skill in the art upon examination of the following figures and detailed description. It is intended that all such additional features, embodiments, aspects, and advantages be included within this description and be protected by the accompanying claims.

BRIEF DESCRIPTION OF DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more examples of an electro-optic modulator (EOM), 3D imaging systems and methods using the disclosed EOMs, and methods of manufacturing the EOMs. These examples, offered not to limit, but only to exemplify and teach embodiments of disclosed EOMs, systems, and methods, are shown and described in sufficient detail to enable those skilled in the art to practice what is claimed. Thus, where appropriate to avoid obscuring the invention, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Also, the use of "or" means "and/or" unless stated otherwise. Similarly, "comprise," "comprises," "comprising" "include," "includes," and "including" are interchangeable and not intended to be limiting.

Figure 1:
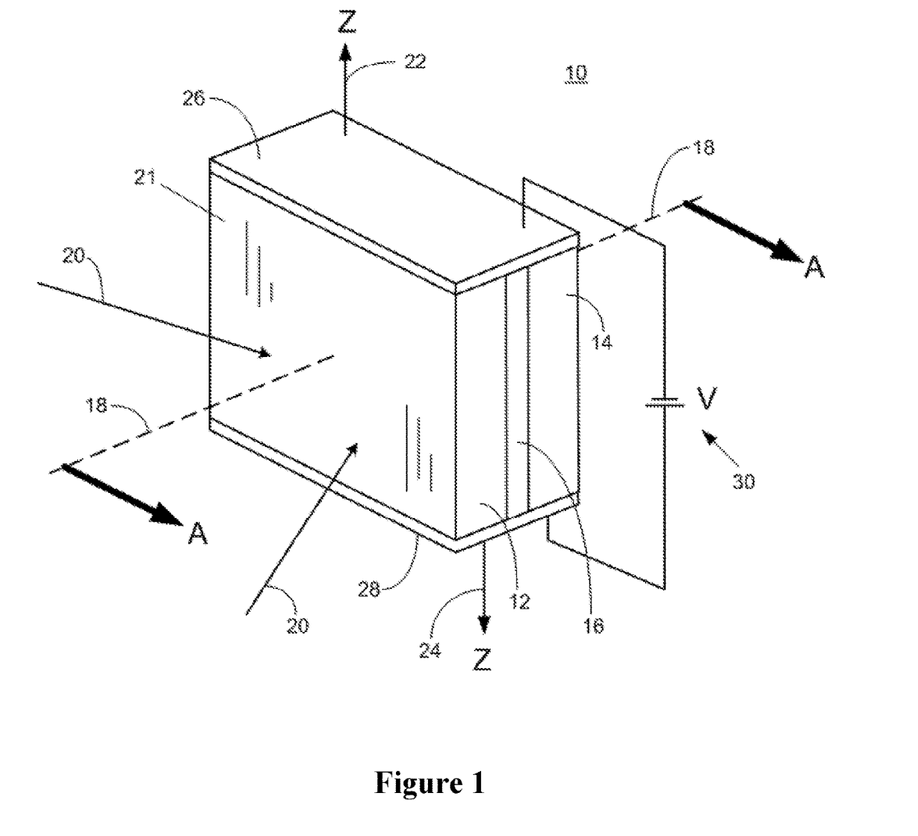
FIG. 1 is a schematic perspective view of an exemplary electro-optic modulator (EOM).

FIG. 1 is a schematic perspective view of an exemplary electro-optic modulator (EOM) 10. Incident light 20 passes through the EOM 10 in the general direction of the optical axis 18 of the EOM 10.

The EOM 10 may be a Pockels cell having first and second slabs of electro-optic (EO) material 12, 14, e.g., a first birefringent crystal 12 and a second birefringent crystal 14, each of which may exhibit the Pockels effect. Alternatively, at least one of the EO materials 12 or 14 could be made of a material that does not exhibit the Pockels effect or does not experience any applied electric field. The EOM 10 also includes a polarization rotator 16 sandwiched between the first and second EO materials 12, 14. The optical axis 18 of the EOM 10 passes through the EOM 10 normal to the incident plane of the EOM 10, which is represented by the incidence surface 21 of the first EO material 12 in the example shown in FIG. 1. To produce an electro-optic effect in the EOM 10, a voltage source 30 is applied to electrodes 26, 28 which are located along opposite edges of the EO materials 12, 14. This creates an electric field parallel to the optic axes 22, 24 (depicted by Z-axes) of the EO materials 12, 14, but transverse to the optical axis 18 of the EOM. 10.

The EO materials 12, 14 are positioned so that so that at least one of their optic axes 22, 24 is aligned so that it is outside the field of view (FOV) of the EOM 10. In the example shown in FIG. 1, each of the EO materials 12, 14 are oriented so that their respective optic axis 22, 24 is outside the FOV of the EOM 10. The FOV of the EOM 10 may be represented by the cone angle A (shown in FIG. 3), which indicates the maximum angle relative to the optical axis 18 of the EOM 10 at which incident light rays 20 may impinge on the input surface 21 of the EOM 10 and be effectively processed by the EOM 10 with acceptable optical errors. The FOV may be a predefined angular value for the EOM 10. The FOV of the EOM 10 may be characterized by a FOV cone (or other suitable geometric volume, such as a pyramid) defined by the maximum acceptable angle of incidence of the EOM 10. The FOV of the EOM 10 may be any suitable value and may depend on the particular application of the EOM 10. For example, the FOV of the EOM 10 may be 5° or more, such as about 16°. In other cases, the FOV of the EOM may be greater than 16°, for example, it may be any value between 16° and 40° or greater. In some cases, it is enough that the optic axes 22, 24 may be oriented so that each is not aligned parallel with the optical axis 18 of the EOM 10. These cases may include, for example, where the FOV is relatively small, e.g., less than 5°, for example, 1° or less. In some configurations, the electro-optic material is chosen and the voltage is applied in directions such that the optic axes of the materials are never within the cone angle of the light transmitted through the EOM 10 during operation of the EOM 10.

As shown in the example of FIG. 1, the EO materials 12, 14 are oriented so that their optic axes 22, 24 are orthogonal to the system optical axis 18 of the EOM 10, and pointing in opposite directions relative to each other. By orienting the EO materials 12, 14 in this manner, the second EO material 14 compensates for the birefringence of the first EO material 12. Having the material optic axes 22, 24 oriented antiparallel, the applied electric field can be in the same direction for both EO materials 12, 14 to produce an additive effect for the refractive indexes of the two EO materials. This reduces the birefringence error of the EOM 10 when it receives incident light rays 20 that have an angle of incidence θ (see FIG. 2) greater than a few degrees, particularly when the EOM 10 is in the on-state (voltage is applied to the EOM 10). Alternatively, the optic axes 22, 24 may be aligned parallel in the same direction. In this case, the voltage can be applied individually across each EO material 12, 14 using four electrodes, with opposite polarity (orientation of + and − leads, for example) over each EO material 12, 14. Alternatively, the electric field can be applied to only one EO material with electrodes on only the one EO material. In this case, the optic axes can be oriented parallel or antiparallel.

Orienting the EO materials 12, 14 so that their optic axes are not aligned in the FOV of the EOM 10 further reduces birefringence error if the EO materials 12, 14 are negatively birefringent, that is, where $\Delta n=n_e-n_o$ is less than zero, where $n_e$ is the extraordinary refractive index and $n_o$ is the ordinary refractive index. The ordinary refractive index $n_o$ is experienced by light traveling along the optic axis of an EO material. Thus, light traveling through a negatively birefringent uniaxial crystal in a direction other than the optic axis is subject to a smaller refractive index, which in turn produces less birefringence.

Orientation of Electro-Optic Materials in EOM

The electro-optic materials (e.g., crystals) 12, 14 may be oriented based on their crystal structures in order to compensate for and reduce optical transmission errors caused by off-axis incident light, i.e., light that impinges on the EOM 10 that is not traveling parallel to the optical axis 18 or other higher order optical effects of the materials 12, 14, such as the Kerr effect or changes in refractive indices relative to changes in temperature, dn/DT. Techniques for determining suitable orientations of the electro-optic materials 12, 14 in the EOM 10 are described below.

In some electro-optic materials 12, 14 that may be used for the EOM 10, the difference in the refractive index for the two basis polarization states is a function of the propagation direction of incident light. For example, for light polarized parallel to a plane containing the extraordinary crystal axis of a uniaxial birefringent crystal, the effective refractive index for that polarization is given by:

$$n(\theta) = \left(\frac{\sin^2\theta}{n_e^2} + \frac{\cos^2\theta}{n_o^2}\right)^{-1/2} \quad \text{(Eq. 1)}$$

Where $n_e$ is the refractive index of the extraordinary axis, $n_o$ is the refractive index of the ordinary axis, $\theta$ is the angle of the incidence of the light wave vector from the optic axis in the plane defined by extraordinary and ordinary axes.

For other crystals where there are three distinct refractive indices corresponding to all three crystal axes (i.e., biaxial birefringent crystals), there are two propagation directions where the eigenstates of the polarization vectors have equal refractive indices. These directions are known as the optic axes of the biaxial crystal, and the directional relationship of these optic axes to the crystal axes are determined by known relationships and formulas. An example is shown below in Equation 2 for the determination of the refractive index in the a-b plane of a biaxial crystal, with refractive indices corresponding to the a, b, and c crystal axes.

$$n_{ab}(\theta) = \left(\frac{\sin^2(\theta)}{na^2} + \frac{\cos^2(\theta)}{nb^2}\right)^{-1/2} \quad \text{(Eq. 2)}$$

In this example, one light polarization experiences a refractive index $n_c$. The other refractive index $n_{ab}(\theta)$ is determined by the angle of light propagation between the a- and b-axes, where $\theta$ is the angle from the a-axis in the a-b plane. Two other equations, familiar to those knowledgeable in the art, exist for propagation in the a-c and b-c planes.

The foregoing angles, equations, and definitions describe the refractive indexes for light that travels through the electro-optic material at non-normal (not zero degrees) angles of incidence relative to the optic axis or axes of the electro-optic material. When light rays pass through the EOM at angles of incidence that are not zero degrees relative to an optic axis, the two orthogonal basis polarization states experience different effective indices of refraction and therefore travel at different speeds, which results in a change of the overall polarization state of the transmitted light. When the EOM 10 is placed between polarizers or other polarization or phase distinguishing elements, the transmission changes. The size of the effect on polarization by an EOM is related to the applied voltage or electric field.

When used in an imaging system for 3D measurement systems or for other uses, the phase differences between the polarization states result in transmission that changes with angle of incident. This change in transmission impacts image quality and may negatively impact the usefulness of EOMs in some applications, such as imaging applications. Compensating crystals are known that provide the opposite phase difference between the polarization states to increase the useful angular acceptance of an EOM. See, for example, West Edward A., "Extending the field of view of KD*P electrooptic modulators," Applied Optics, Vol. 17 No. 18, pp. 3010-3013 (15 Sep. 1978). West describes an EOM with a KDP crystal with its extraordinary axis parallel to the imaging system optical axis combined with a $MgF_2$ crystal, since KDP is negatively birefringent and $MgF_2$ is positively birefringent. This combination improved the contrast and angular acceptance of the EOM in its off state when no voltage (electric field) was applied to the EOM.

However, when voltage is applied in this known EOM in the extraordinary axis direction (a longitudinal Pockels cell), the KDP crystal becomes biaxial and the $MgF_2$ no longer compensates the KDP birefringence for off-axis light and the contrast and imaging performance is degraded for the non-zero angle of incidence case. In particular, the optic axes for the KDP are separated from the original extraordinary crystal axis by a few degrees. If the incident light cones are smaller than this angle, degradation is much less and may not be significant. However, if light cones are larger than this angle, no polarization state change occurs in these directions so the EOM does little or nothing to the transmission along those directions, resulting in reduced contrast (contrast is the ratio of the on-state to the off-state transmission). The reduced contrast of off-axis incident light when voltage is applied to the EOM limits the usefulness of this known compensation technique. The EOMs disclosed herein address at least this problem by orienting the materials 12, 14 to more effectively compensate for birefringence errors of off-axis incident light in the on-state (when voltage is applied over the material 12, 14).

In their on-state, electro-optic modulators such as Pockels cells make use of the change to the electronic structure, ionic structure, and other similar material properties (for example, piezoelectric properties among others) when an electric field is applied, such as using an applied voltage. The orientation of the principal axes of the material and the applied electric field may be selected based on the application, as well as the electronic structure and similar properties of the material and how that structure responds to applied fields. The principle axes can be the axes of a crystalline material or can be some other basis of the electronic structure for the electro-optic material.

In some instances, the refractive index of electro-optic materials is voltage dependent, i.e., it depends on the electric field applied to the material. For materials that undergo change due to a $2^{nd}$ order effect such as the Pockels effect, there is a $3^{rd}$ rank tensor known as the second-order susceptibility that can be used to describe these electronic-field interactions within the material. There are symmetry rules that can apply that may reduce this tensor to a 6×3 matrix of electro-optics coefficients, whose elements can be denoted as $r_{ij}$. The interaction between the applied electric field and induced changes in the refractive index of the material through the second-order susceptibility is determined by diagonalizing the following Equation 3 (which describes the index ellipsoid equation used for determining the refractive indices observed by a light wave traveling through an optical material—such as a crystal).

$$\left(\frac{1}{n_x^2} + r_{1k}E_k\right)x^2 + \left(\frac{1}{n_y^2} + r_{2k}E_k\right)y^2 + \left(\frac{1}{n_z^2} + r_{3k}E_k\right)z^2 + 2yzr_{4k}E_k + 2zxr_{5k}E_k + 2xyr_{6k}E_k = 0. \quad \text{(Eq. 3)}$$

In Equation 3, $E_k$ is the electric field applied along an axis in the k direction; x, y and z each represent a crystal axis of the material, $n_x$, $n_y$, $n_z$ represent the indexes of refraction along the x, y, z axes, respectively; and $r_{ij}$ represent the tensor elements.

The values of the electro-optic coefficients are determined by crystal classes that represent the electronic structure of the material and symmetry operations. These classes may also be used for non-crystalline materials as well that have similar electronic structures or symmetry. For example, potassium dihydrogen phosphate has two non-zero electro-optic coefficients, $r_{14}$ and $r_{63}$. If the electric field is applied in the z-direction, $E_z$, and with incident light also propagating in the z-direction, then the above Equation 3 becomes $$\frac{x^2}{n_x^2} + \frac{y^2}{n_y^2} + 2xyr_{63}E_z = 0 \quad \text{(Eq. 4)}$$

Equation 4 describes the voltage dependent refractive index, and can be diagonalized (a mathematical manipulation method that only has terms dependent upon $x^2$ and $y^2$, without terms dependent on cross multiplication terms such as xy). In this case, the new x and y axes (now designated as x' and y') are rotated 45° from the original x and y crystal axes. The mathematical rotation of 45 degrees is about the z-axis. The resulting rotated, voltage dependent refractive index equation with newly defined refractive indices, $n_x'$ and $n_y'$ is written as:

$$\frac{x^2}{n_x^2} + \frac{y^2}{n_y^2} + 2xyr_{63}E_z = 0$$

(add an x' and y' o the equation and eliminate the term $2xyr_{63}Ez$) (Eq. 5)

Where $$n_{x,y}' = n_{x,y}^0 \pm \frac{1}{2}n_o^3 r_{63}E_z \quad \text{(Eq. 6)}$$

The usefulness of Equation 6 is that it describes how the refractive index changes with the externally applied electric field. Similar mathematical steps can be used to determine useful configurations of propagation directions, material orientations, and electric field directions for other materials or other desired interactions and applications.

Based on the foregoing, certain electro-optic materials, their orientations of the material axes, and the orientation of the applied electric field may be determined to achieve a desired optical or system performance, for example, in some cases so that the optic axis or optic axes of the material in directions that are not along any propagation direction of interest in the optical system or that any overlap of such directions with the optic axis is lessened.

Example Electro-Optic (EO) Materials

Although the example of FIG. 1 shows the electro-optic materials 12, 14 as being birefringent crystals, any suitable electro-optic material may be used. For example, the EO materials 12, 14 may be lithium niobate ($LiNbO_3$), lithium tantalate ($LiTaO_3$), or potassium dihydrogen phosphate (KD*P) crystals. All of these are uniaxial crystals that are negatively birefringent.

Other materials may be used for electro-optic materials 12, 14. For example, the materials may be isostructural similar materials or solid solutions of lithium niobate ($LiNbO_3$), lithium tantalate ($LiTaO_3$), or potassium dihydrogen phosphate (KDP) crystals. For example, a solid solution exists between lithium niobate and lithium tantalate. Any material with a composition of $LiNb_xTa_{(1-x)}O_3$; where x is a number bounded between 0 and 1, i.e., 0≤x≤1, may be a suitable material.

Other materials that may be used for electro-optic materials 12, 14 include potassium dihydrogen phosphate and its isomorphs. For potassium dihydrogen phosphate, a solid solution exists where hydrogen is substituted by deuterium (heavy hydrogen). Any solid solution of $KH_{2x}D_{2(1-x)}PO_4$ where x is a number bounded between 0 and 1, i.e., 0≤x≤1, may be a suitable material. KD*P ($KD_2PO_4$) (KD*P is also known as DKDP, deuterated potassium dihydrogen phosphate, potassium di-deuterium phosphate, or deuterated potassium phosphate mono-basic) may be used for electro-optic materials 12, 14. The materials may alternatively consist of solid solutions of materials which are isomorphs of KDP or KD*P. For example, $NH_4$, Rb, and Cs may be substituted for K, and As may be substituted for P. All of these isostructural variants may be suitable materials 12, 14 for the EOM 10. The isostructural materials to DKDP may generally consists of a group of chemicals having the generic formula $A_xB_yC_zH_{2r}D_{2(1-r)}F_sG_{(1-S)}O_4$; where x+y+z=1; 0≤r≤1; 0≤s≤1; A, B, C are selected from the elements or ions of $NH_4$, K, Rb, Cs; H is hydrogen and D is deuterium; and F and G are selected from the ions phosphorous or arsenic. For example, when y=z=r=s=0 and A=K, and G=P the described compound is the material $KD_2PO_4$.

Other materials that may be used for electro-optic materials 12, 14 include materials selected from the group consisting of or isostructural to PZT (lead zirconate titanate). Such a group consists of a chemical having the generic formula for oxide ferroelectric $Pb[Zr_xTi_{1-x}]O_3$, where 0≤x≤1.

Other materials that may be used for electro-optic materials 12, 14 include any material, crystal or ceramic selected from the generic formula for an oxide ferroelectric $A_xB_yC_zFO_3$; where x+y+z=1; A and B and C are selected from the following elements or ions: Ba, Sr, Ca, Mg, Pb, Bi; F is selected from the following elements or ions: Ti or Zr or partial solid solution between each element. A common electro-optic semiconductor compound that may be used, $BaTiO_3$, is obtained from the generic formula where A=Ba, F=Ti, x=1, y=z=0.

Other materials that may be used for electro-optic materials 12, 14 include any material, crystal or ceramic selected from the generic formula for a semiconductor $(A_xB_yC_z)(D_qE_rF_s)$; where x+y+z=1 and q+r+s=1; A and B and C are selected from the following elements or ions Ga, In, or Al; and D, E, and F are each selected from P, As, or Sb. An electro-optic material that may be used is the semiconductor compound GaAs, which is obtained from the generic formula where A=Ga, D=As, x=1, q=1, x=y=r=s=0.

Other materials that may be used for electro-optic materials 12, 14 include any material, crystal or ceramic selected from the generic formula for a semiconductor $(A_xB_yC_z)(G_qH_rL_s)$; where x+y+z=1 and q+r+s=1; A and B and C are each selected from the following elements or ions Zn, Cd, Hg; and G, H, and L are each selected from S, Se, Te. An exemplary electro-optic material that may be used is the semiconductor compound and electro-optic material CdS, which is obtained from this generic formula where A=Cd, G=S, x=1, q=1, x=y=r=s=0.

Other materials that may be used for electro-optic materials 12, 14 include any material, crystal or ceramic selected from the generic formula $AIO_3$, where A is selected from the elements or ions H, Li, K. Rb, Cs. For example, the ferro-electric material $KIO_3$, also known as potassium iodate, may be used, where A=K in the formula.

Other materials that may be used for electro-optic materials 12, 14 include any material, crystal or ceramic selected from the generic formula for ferroelectric polymers. Such polymers include but are not limited to polyvinylidene fluoride or (PVDF), also written as $(CH_2CF_2)_n$, or vinylidene fluoride-trifluoroethylene copolymer, also written as $(CH_2CF_2)_x(CHFCF_2)_{(1-x)}$, or $(VDF)_x(TRFE)_{(1-x)}$ where $0 \leq x \leq 1$.

Other materials that may be used for electro-optic materials 12, 14 may include liquid crystals, other material yet to be invented, or the like. The material arrangement and applied voltage is determined based on the material and system requirements.

The first electro-optic material 12 and second electro-optic material 14 may be the same material. Alternatively, the electro-optic materials 12, 14 may each be a different material. Any suitable combination of the foregoing materials described above may be used for the materials 12, 14.

Although certain examples of the EO materials 12, 14 may be birefringent, the EO materials 12, 14 may alternatively have a small or zero birefringence in some cases—as in the case of cubic symmetry materials, such as GaAs, or in uniaxial or biaxial materials in which the birefringence is made small. For example, one or both of the EO materials 12, 14 may have no birefringence. Alternatively, the EOM 10 may have a single EO material with little or no birefringence instead of two slabs of EO material 12, 14.

Figure 2:
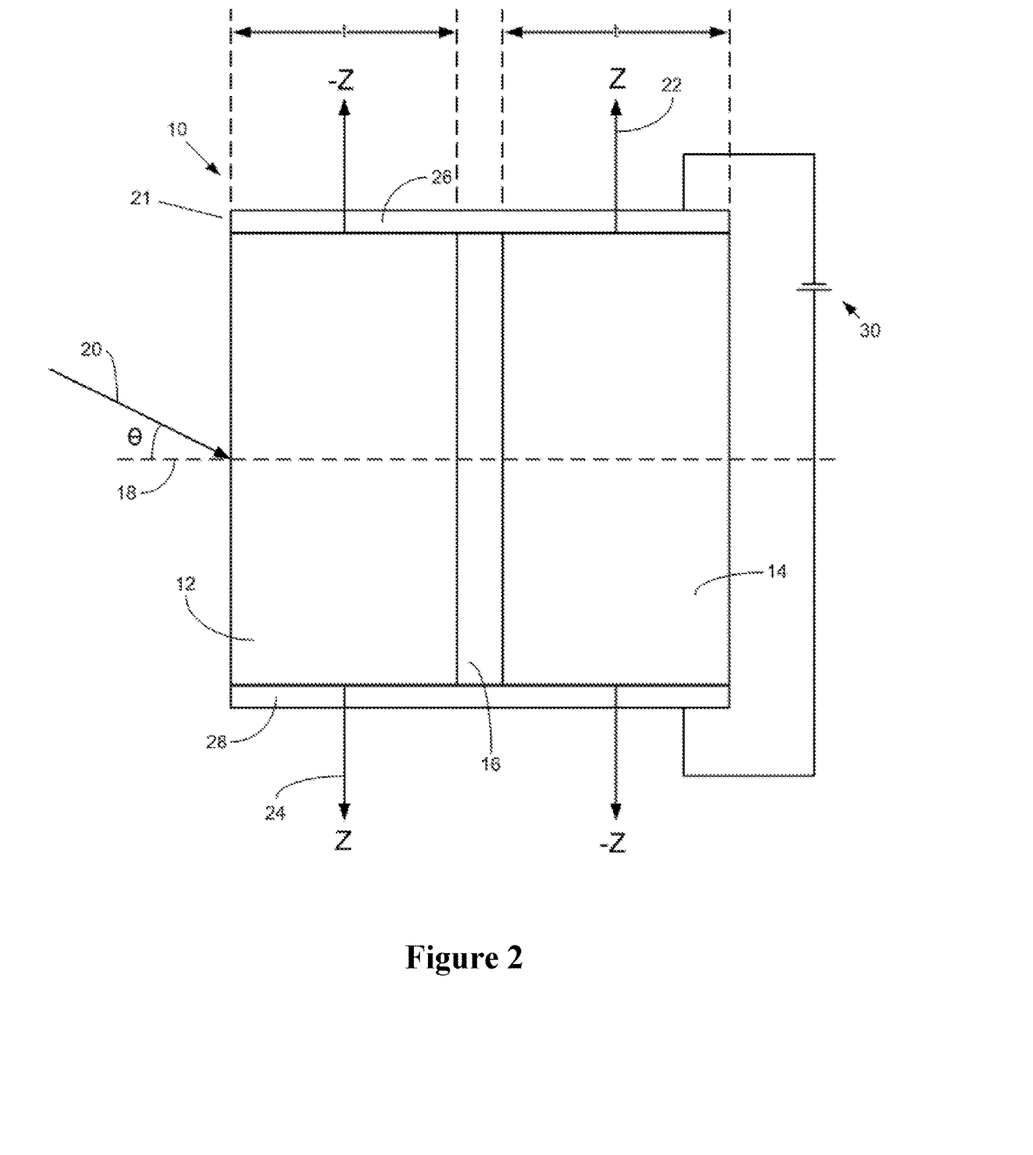
FIG. 2 is a schematic cross-sectional view of the EOM shown in FIG. 1 along section line A-A.

The EO materials 12, 14 are matched in thickness, t, as shown in FIG. 2. The thickness of each EO material 12, 14 can be any suitable size as determined by system design considerations. For example, the thickness of each EO material 12, 14 may be greater than 20 mm, or may be between 10 and 20 mm, or may be between 5 and 10 mm, or between 1 and 5 mm, and in some instances the thickness may be <1 mm. For example, in some cases each EO material thickness of may be less than 100 µm, in some cases less than 10 µm, and in some instances, less than 1 µm. The EO materials 12, 14 may have different thicknesses from each other, in some configurations.

Alternatively, if one EO material has variations in optical phase due to material non-uniformities or fabrication non-uniformities, the other EO material may be fabricated with features such that such non-uniformities in the first EO material are compensated by the second EO material.

The aperture of the EO materials 12, 14 may be any suitable width. For example, the aperture may be wide enough to accommodate the transmitted light through an imaging system as determined by the position of where the EOM is located is located within the imaging system. For example, the aperture may be less than 10 mm, or may be between 10 and 20 mm, or may be greater than 20 mm. In some cases, the aperture is square, in other cases, the aperture may be round or elliptical, and in some cases rectangular or some other suitable shape as is useful for the overall optical or system.

In some cases where the electrodes are transverse and the electric field is applied perpendicular to the EOM optical axis 18, the aperture distance along the electric field direction is reduced in order to reduce the applied voltage or electric field required to achieve a specific phase change. For example, for lithium niobate or for lithium tantalate crystals, the applied voltage may be approximately 4.5 kV for an electrode spacing of approximately 11 mm. The applied voltage is determined by the material used, the orientation of the material or crystal axes, and the size of the crystal. In some cases, the aperture size may be reduced for other design requirements.

In some configurations, the ratio of the material thickness to the aperture size may be greater than one as is typical for transverse EOM. Alternatively, this ratio may be less than one, approximately one, or less than or approximately 0.5 or smaller.

The polarization rotator 16 may be any suitable device for changing the polarization state of incident light received by the EOM 10. For example, the polarization rotator 16 may be a half-waveplate that accomplishes changing the polarization state of the light transmitted through the first EO material 12 such that the polarization state in the second EO material 14 is that needed for appropriate phase compensation. For example, if the two EO materials 12, 14 are uniaxial crystals and the two EO materials 12, 14 are oriented such that the optic axes are parallel or anti-parallel in the EOM 10, the polarization rotator 16 may be a half-wave plate oriented at 45° with respect to the optic axes. The effect in this example is that the polarization state in the second EO material 14 is inverted with respect to the extraordinary and ordinary axes and the overall phase is approximately compensated without having to reorient the axes of the second EO material 14.

Alternatively, the polarization rotator 16 may be comprise a series of multiple waveplates that accomplish the same result. In this case, the rotator 16 may include two or more waveplates, each waveplate oriented at a predefined angle. The waveplates may be oriented so the refractive indices are additive or subtractive. In combination, the waveplates may function as a single polarization rotator as shown in FIG. 1.

Alternatively, the second EO material 14 may be rotated with respect to the first so that it functions as the polarization rotator 16, and a separate optical element for the rotator 16 may be omitted. In this configuration, the EOM 10 may include only the electro-optic materials 12, 14. Some crystal pairs may benefit from this configuration of rotating the orientation of the crystal axes, depending on the electro-optic tensor elements involved, the orientation of the crystals, and the orientation of the incident polarization state.

As a further alternative, the polarization rotator 16 may be an optical rotator made of a material such as quartz or other materials that rotate the polarization state of incident light. Other materials suitable for optical rotation may also be used for the polarization rotator 16 in some cases, including but not limited to materials such as $K_2S_2O_6$ (potassium dithionate) or $DIO_3$, $HIO_3$, $\alpha\text{-}HIO_3$ (deuterated iodic acid, iodic acid or alpha-iodic acid, respectively), or the like.

Any suitable combination of the aforementioned optic elements and/or configurations may be used to accomplish the function of the polarization rotator 16.

The voltage source 30 may be any suitable electrical power supply for operating the EOM 10 to achieve the desired electro-optic modulation. For example, the voltage source may supply tens, hundreds or thousands of volts across the EO materials 12, 14 via electrodes 26, 28 to drive the Pockels cell to at least its half-wave voltage.

The electrodes 26, 28 may include any suitable conductor, e.g., a metal such as gold, aluminum, copper, solder, a conductive polymer, or the like, or a transparent conductor such as indium tin oxide (ITO), fluorine doped tin oxide (FTO), or doped zinc oxide, or the like.

The EOM 10 may be constructed by optically contacting or bonding the materials 12, 14 and rotator 16 together. Prior to optical contacting or optical bonding, antireflection coatings, appropriate for each interface (air-crystal, air-polymer, polymer-crystal, crystal-crystal, and so forth) may be applied to the electro-optic material 12, 14 faces and to the polarization rotator 16 faces. Prior to optical contacting or optical bonding, the polarization rotator 16, whether consisting of a single waveplate material, a combination of waveplate materials, or individual waveplates placed at appropriate angles, may be inserted between the first material 12 and the second material 14. The assembled EOM 10 may have appropriate materials or coatings applied to the surfaces which allow electrical voltage to be applied. Other surfaces of the assemble EOM 10 may have materials applied appropriate to the distribution of, removal of or the addition of heat to the EOM 10 to stabilize its temperature or accomplish other thermal management.

Figure 3:
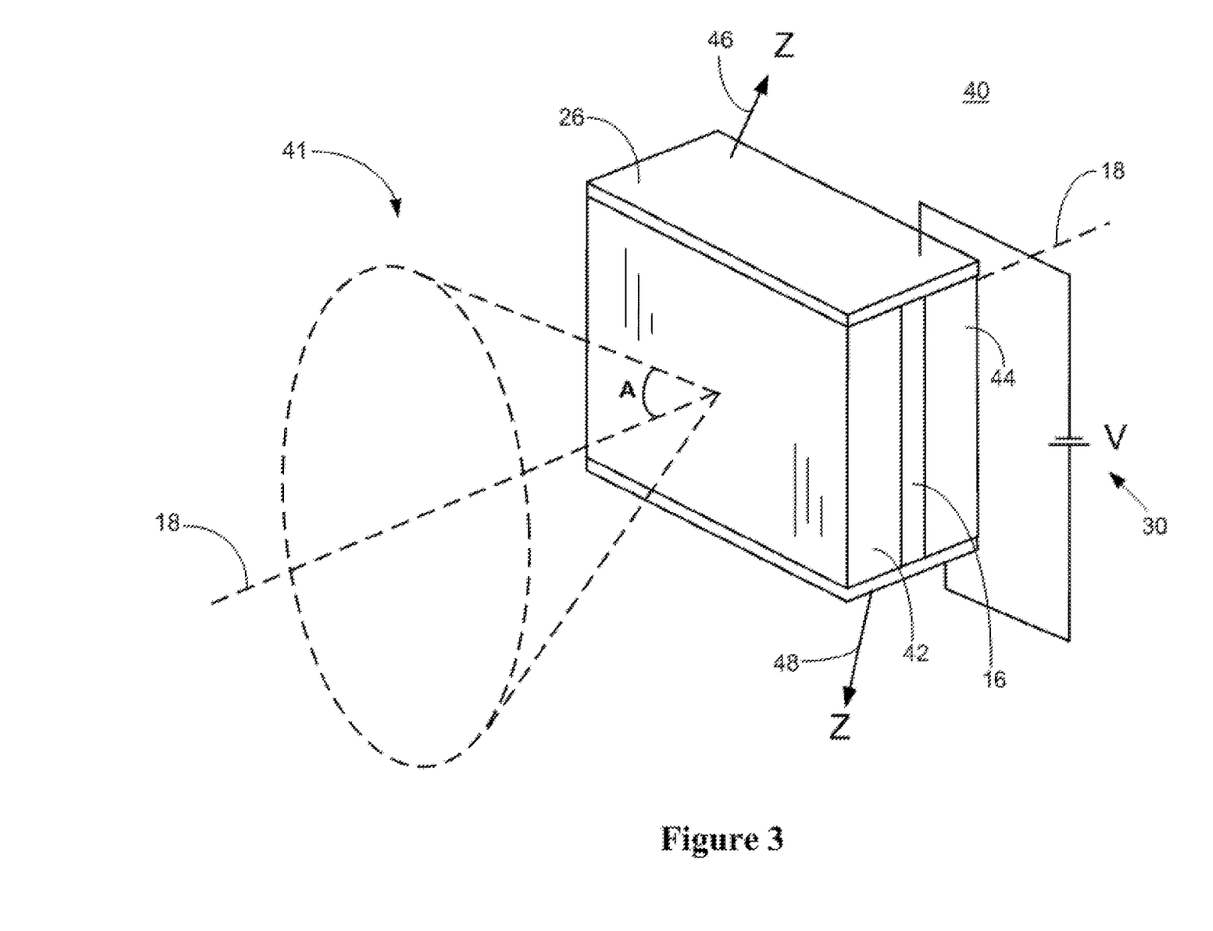
FIG. 3 is a schematic perspective view of a second disclosed exemplary electro-optic modulator (EOM).

FIG. 3 is a schematic perspective view of a second exemplary electro-optic modulator (EOM) 40. The EOM 40 may be a Pockels cell having first and second slabs of electro-optic material 42, 44, e.g., a first birefringent crystal 42 and a second birefringent crystal 44 each exhibiting the Pockels effect. The other elements of the EOM 40 may be the same as those disclosed for EOM 10. The EOM 40 differs from the EOM 10 of FIGS. 1 and 2 in that each EO material 42, 44 is oriented in the EOM 40 so that its respective optic axis 46, 48 is not orthogonal to the system optical axis 18 of the EOM 40, but is nevertheless aligned so that the optic axis 46, 48 is outside the field of view (FOV) of the EOM 40. In other words, the angle between each optic axis 46, 48 and the optical axis 18 is greater that the cone angle A. The FOV of the EOM 40 is depicted by the FOV cone 41 shown in FIG. 3. The EO materials 42, 44 may be same as any of those described in connection with EOM 10 and may have the dimensions disclosed for the EO materials of the EOM 10; and EOM 40 may operate as described above in connection with EOM 10. In some cases, one or both of the EO materials 42, 44 may have no birefringence. Alternatively, the EOM 10 may have a single EO material with little or no birefringence instead of two slabs of EO material 42, 44.

Although the exemplary EOMs 10, 40 each include a pair of EO materials 12, 14 and 42, 44, respectively, in other configurations the EOMs 10, 40 may have a different number of EO material slabs. For example, in some configurations, an EOM may have a single EO material slab oriented so that at least one of its optic axes (if it has more than one optic axis) is outside the FOV of the EOM or the FOV of the system. In other configurations, an EOM may have three or more EO material slabs, with at least one of the slabs oriented so that at least one of its optic axes (if it has more than one optic axis) is outside the FOV of the EOM or the FOV of the system. For example, in some cases, the EOM may include three EO materials, with one or more of the EO materials being oriented so that it has at least one optic axis outside the FOV of the EOM or system. In this configuration, the first EOM material and third EOM material may each be one-half the thickness of the middle EOM material.

Figure 4:
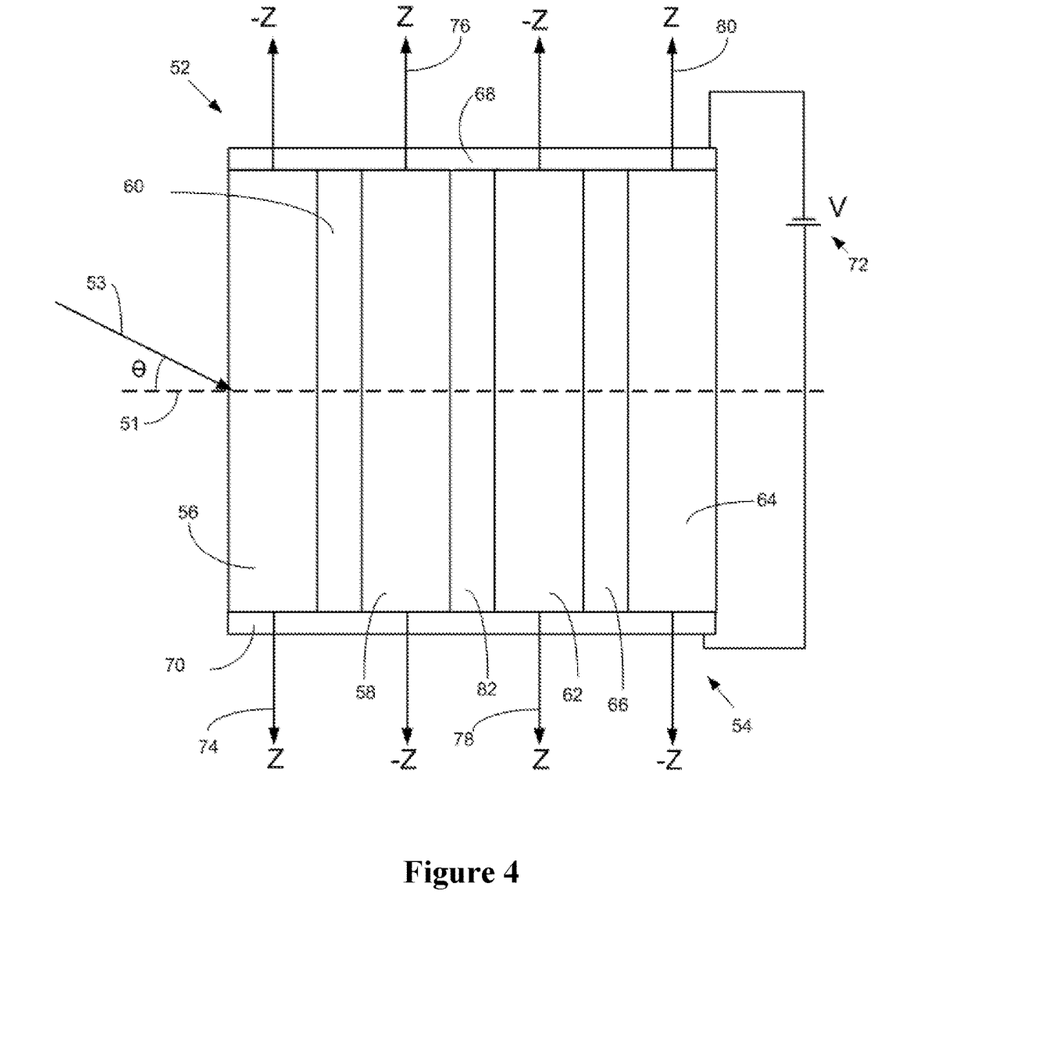
FIG. 4 is a schematic cross-sectional view of a third disclosed exemplary EOM.

FIG. 4 is a schematic cross-sectional view of a third exemplary EOM 50. The EOM 50 includes two or more electro-optic (EO) cells 52 and 54. Each electro-optic cell 52, 54 may include a structure similar to the first disclosed EOM 10 or the second disclosed EOM 40. An optional air gap 82 exists between the cells 52, 54.

The structure of using two or more EO cells in the EOM 50 has an advantage in that it reduces the compensation matching requirements between each EO material pair in each cell. The structure may also make the EOM 50 relatively insensitive to effects caused by temperature changes or other changes due to environmental conditions. Additional advantages may include a configuration in which the individual EO materials may be thinner so as to reduce the sensitivity of each cell 52, 54 to fabrication variations, temperature effects, or other non-ideal conditions. Additionally, increasing the number of cells beyond one may also reduce the applied voltage to achieve the desired optical modulation.

The first electro-optic (EO) cell 52 includes a first EO material 56, e.g., a first birefringent crystal, a second EO material 58, e.g., a second birefringent crystal, and a first polarization rotator 60 sandwiched between the two EO materials 56, 58. The first EO material 56 is configured to receive incident light 53. The incoming light rays 53 may be received with an angle of incidence θ. The first EO material 56 has an optic axis 74 that is not parallel to the optical axis 51 of the EOM 50. The optic axis 74 indicates the direction through the first EO material 56 along which a ray of light passing through the first EO material 56 experiences no birefringence. The first EO material 56 is positioned within the EOM 50 so that its optic axis 74 is not aligned parallel to the optical axis 51 of the EOM 50 and is generally outside the FOV of the EOM 50.

The first polarization rotator 60 is configured to receive light output from the first EO material 56. Light passing through the polarization rotator 60 is then received at the second EO material 58. The second EO material 58 is positioned in the EOM 50 such that its optic axis 76 is not parallel to the optical axis 51 of the EOM 50 and is generally outside the FOV of the EOM 50. The optic axis 76 of the second EO material 58 indicates the direction through the second EO material 58 along which a ray of light passing through the second EO material 58 experiences no birefringence. In operation, the second EO material 58 compensates for the birefringence and/or other higher-order optic characteristics of the first EO material 56 to reduce birefringence or other higher-order optical errors of the EOM 50, thereby increasing the angle of acceptance for incoming light 53.

The second EO cell 54 includes a third EO material 62, a fourth electro-optic material 64, and a second polarization rotator 66 sandwiched between the two EO materials 62, 64.

The third and fourth EO materials 62, 64 may be birefringent crystals. The third EO material 62 is configured to receive light output from the second EO material 58. The third EO material 62 has an optic axis 78 indicating the direction through the third EO material 62 along which a ray of light passing through the third EO material 62 experiences no birefringence. The third EO material 62 is positioned within the EOM 50 so that its optic axis 78 is not parallel to the optical axis 51 of the EOM 50 and is generally outside the FOV of the EOM 50. The second polarization rotator 66 receives light output from the third EO material 62. The fourth electro-optic material 64 receives light output from the second polarization rotator 66. The fourth electro-optic material 64 has an optic axis 80 indicating a direction through the fourth electro-optic material 64 along which a ray of light passing through the fourth electro-optic material 64 experiences no birefringence. The fourth electro-optic material 64 is positioned within the EOM 50 so that its optic axis 80 is not parallel to the optical axis 51 of the EOM 50 and is generally outside the FOV of the EOM 50. In operation, the fourth EO material 64 compensates for the birefringence and/or other higher-order optical characteristics of the third EO material 62 to reduce birefringence or other higher-order optical transmission errors of the EOM 50, thereby increasing the angle of acceptance for incoming light 53.

As shown in the example of FIG. 4, the EO materials 56, 58, 62, 64 are oriented so that their optic axes 74, 76, 78, 80 are orthogonal to the optical axis 51 of the EOM 50. The EO materials 56, 58 in the first EO cell 52 are positioned so that their optic axes point in opposite (180° apart) directions from each other, and the EO materials 62, 64 in the second EO cell 54 are likewise positioned with their optic axes pointing in opposite directions relative to each other. By orienting the EO materials 56, 58, 62, 64 in this manner, the second EO material 58 compensates for the birefringence and/or other higher-order characteristic of the first EO material 56, and the fourth EO material 64 compensates for the birefringence and/or other higher-order characteristic of the third EO material 62. This reduces the birefringence error or other higher-order optical transmission errors of the EOM 50 when it receives incident light rays 53 that have an angle of incidence θ greater than a few degrees.

Alternatively, the EO materials 56, 58, 62, 64 may be oriented so that their optic axes 74, 76, 78, 80 are not orthogonal to the optical axis 51 of the EOM 50, yet remain outside the system FOV. In some cases, the optic axes 74, 76, 78, 80 may parallel to each other, pointing in the same direct. In other cases, the optic axes 74, 76, 78, 80 are not parallel to each other.

Orienting the EO materials 56, 58, 62, 64 so that their optic axes 74, 76, 78, 80 are not aligned in the FOV of the EOM 50 or the system incorporating the EOM 50 may also reduce birefringence error and/or other higher-order optical errors. The EO materials 56, 58, 62, 64 may be each negatively birefringent. As described herein in connection with FIG. 1, light traveling through a negative birefringent uniaxial crystal in a direction other than the optic axis is subject to a smaller refractive index, which in turn produces less birefringence.

To produce an electro-optic effect in the EOM 50, a voltage source 72 is applied to electrodes 68, 70 which are located along opposite edges of the EO materials 56, 58, 62, 64. This creates an electric field parallel to the optic axes 74, 76, 78, 80 of the EO materials 56, 58, 62, 64, but transverse to the optical axis 51 of the EOM 50. The voltage source 72 may be any suitable electrical power supply for operating the EOM 50 to achieve the desired electro-optic modulation. For example, the voltage source may supply tens, hundreds or thousands of volts across the EO materials 56, 58, 62, 64 via electrodes 68, 70 to drive the Pockels cell to at least its half-wave voltage. In other configurations, the applied voltage may be less than or more than the half-wave voltage according to system requirements.

The electrodes 68, 70 may include any suitable conductor, e.g., a metal such as gold, aluminum, copper, solder, a conductive polymer, or the like, or a transparent conductor such as indium tin oxide (ITO), fluorine doped tin oxide (FTO), or doped zinc oxide, or the like.

The EO materials 56, 58, 62, 64 may be any suitable electro-optic material, such as lithium niobate ($LiNbO_3$), lithium tantalate ($LiTaO_3$), or potassium dihydrogen phosphate (KDP) materials or crystals. The EO materials 56, 58, 62, 64 may also be isostructural similar materials or solid solutions of lithium niobate ($LiNbO_3$), lithium tantalate ($LiTaO_3$), or potassium dihydrogen phosphate (KDP) crystals. For example, a solid solution exists between lithium niobate and lithium tantalate. Any material with a composition of $LiNb_xTa_{(1-x)}O_3$; where x is a number bounded between 0 and 1 $0 \leq x \leq 1$ may be a suitable material. For potassium dihydrogen phosphate, a solid solution exists where hydrogen is substituted by deuterium (heavy hydrogen). Any solid solution of $KH_{2x}D_{2(1-x)}PO_4$ where x is a number bounded between 0 and 1 ($0 \leq x \leq 1$) may be a suitable material. The materials may consist of solid solutions of materials which are isomorphs of KDP or KD*P. For example, $NH_4$, Rb, and Cs may be substituted for K, and As may be substituted for P. All of these isostructural variants may be suitable materials. All of these are uniaxial crystals that are negatively birefringent.

Other material may be used for the EO materials 56, 58, 62, 64. For example, the EO materials 56, 58, 62, 64 may be same as any of the other materials described in connection with EOM 10 and may have any of the dimensions and shapes disclosed for the EO materials of the EOM 10

The EO materials 56, 58, 62, 64 may be matched in thickness, t, as shown in FIG. 4. Alternatively, the thicknesses may be different among the EO materials 56, 58, 62, 64. The thickness of each EO material 56, 58, 62, 64 may be any of the thicknesses disclosed above for the EO materials of the EOMs 10, 40 described herein in connection with FIGS. 1-3.

Each of the polarization rotators 60, 66 may be any suitable device for changing the polarization state of incident light 53 received by the EOM 50. For example, each of the polarization rotators 60, 66 may include any of the structures or materials for the polarization rotator 16 disclosed above in connection with FIGS. 1-3. The polarization rotators 60, 66 may have the same material and structure, or alternatively, the rotators 60, 66 may have a different construction from each other.

As noted above, the EOM 50 may include more than two EO cells, for example, three cells, four cells, five cells or more. The EO cells may be homogenous, that is, they may repeat each other. For instance, they may include same EO materials oriented in the same direction with same thickness and same polarization rotator structures. Alternatively, the EO cells may be heterogeneous, that is, they may have different EOs material, thickness orientations, polarization rotators, voltage level, and the like from one another. For example, the crystals in each cell can be different (such as KDP and MgF2) and don't even need to have voltage applied to both. Other crystals can be used, such as sapphire.

Although shown as being across all of the EO cells 52, 54, the electrodes 68, 70 may alternatively be across only some EO materials, or alternating (e.g., +/−/+/− on one side of the EO materials and −/+/−/+ on the opposite side of the EO materials).

Although the EOMs 10, 40, 50 illustrated in FIGS. 1-4 depict examples of Pockels cells, the EOMs can include EO materials that exhibit the Kerr effect, and thus, the EOMs may instead be Kerr cells.

Figure 5:
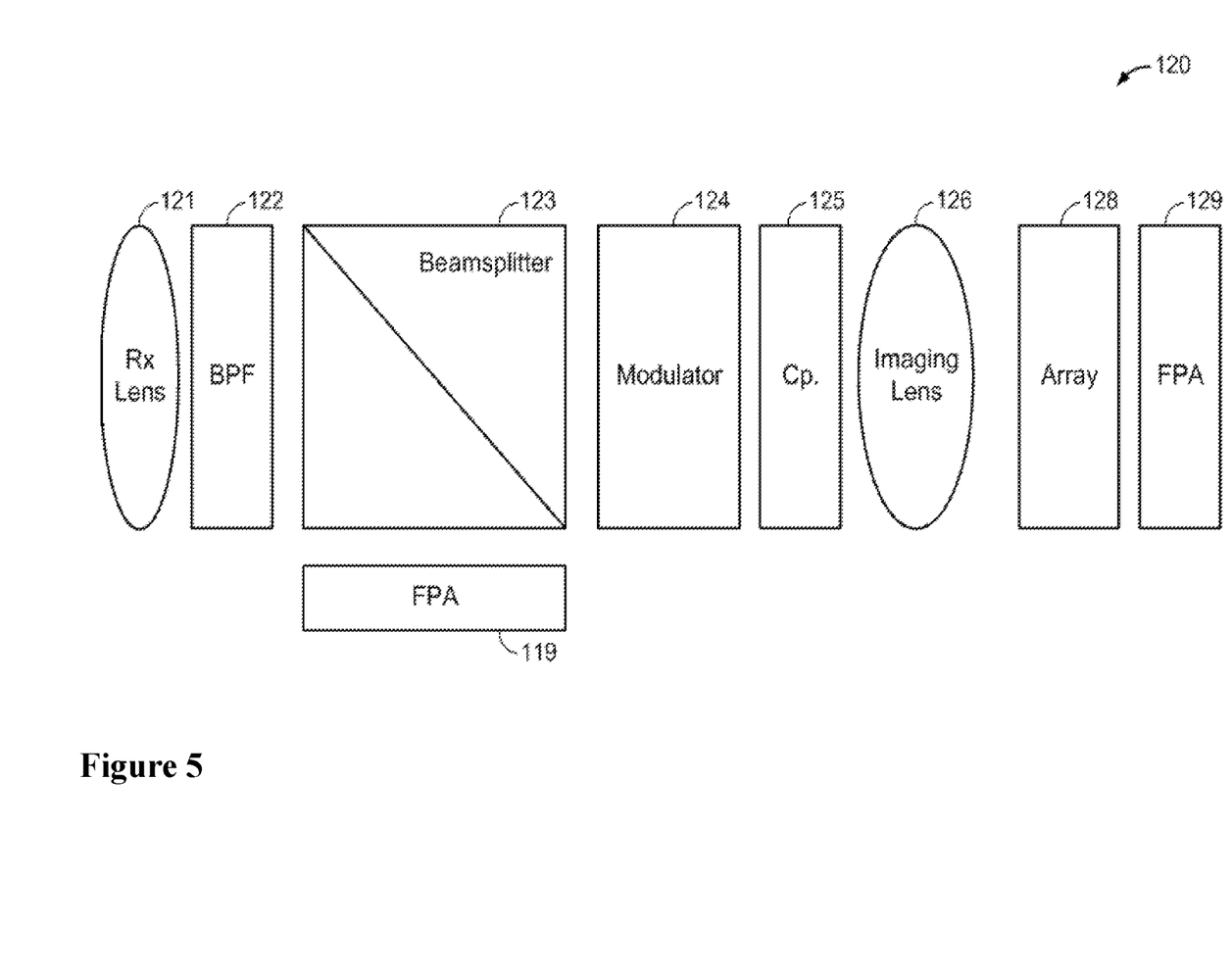
FIG. 5 schematically illustrates an example of a 3D imaging system that may incorporate any of the disclosed EOMs, for example, the first, second, or third disclosed EOM.

FIG. 5 schematically illustrates an example of a 3D imaging sensor system or camera 120 that may incorporate any of the disclosed EOMs, for example, the first disclosed EOM 10, second disclosed EOM 40, or third disclosed EOM 50 as the modulator 124 and/or compensator 125. A compact 3D camera system 120 may be achieved by integrating any of the disclosed EOMs e.g., EOMs 10, 40, 50, with elements of 3D camera system described U.S. Pat. No. 8,471,895 B2, which is incorporated by reference in its entirety as if fully set forth herein (referred to herein as the "'895 patent"). Additional details of the components of the sensor system 120 are disclosed in the '895 patent. The system 120 may optionally include visible imaging subsystem 530 show and described in connection with FIG. 5 of the '895 patent, which portions of the '895 patent are specifically incorporated by reference as though set forth in their entirety herein. The subsystem 530 is omitted from FIG. 4 for clarity.

The system 120 includes receiving (Rx) lens 121, bandpass filter (BPF) 122, optional compensator (Cp.) 125, optional imaging lens 126, and FPA 129, each of which may be the same as described with respect to the corresponding components illustrated in FIG. 5 of the '895 patent, such description of the FIG. 5 elements of the '895 patent being specifically incorporated by reference as though fully set forth herein. The modulator 124 and compensator 125 (which may be, for example, either EOM 10, EOM 40, or EOM 50) have the EOM structures disclosed herein, but may be operated and have modulator functions for 3D imaging as described in the '895 patent.

The system 120 may also optionally include element array 128, which may be any of the polarizing arrays or transmission-based arrays described in U.S. patent application Ser. No. 15/445,560 filed on Feb. 28, 2017, entitled "3D Imaging System and Method," which is hereby expressly incorporated by reference in its entirety as though set forth fully herein.

Some configurations of a 3D imaging system incorporating any of the EOMs disclosed herein, e.g., EOM 10, EOM 40, or EOM 50, as the modulator/compensator may use all of the other camera elements shown in FIG. 5 of the '895 patent, with the disclosed EOM being substituted for modulator 524 disclosed in the '895 patent. For example, the system 120 of FIG. 4 herein may include optional beamsplitter 123 which is at any suitable position before the modulator (here, between bandpass filter 122 and modulator 124), which directs a portion of the received light to optional FPA 119, which obtains an image of the scene based thereon. The remainder of the light is transmitted to modulator 124, which modulates the light transmitted there through, and FPA 129 obtains an image of the scene based thereon. In some configurations, the images obtained by FPA 119 and FPA 129 may differ in that the former is based on unmodulated light, while the latter is based on modulated light. The image obtained by FPA 119 may be used to normalize the image obtained by FPA 129. Specifically, the intensity at any pixel (i,j) of FPA 119 may be used as the value $I_{total,i,j}$ in the distance calculations discussed in the '895 patent with reference to equations (8) to (15) therein, which subject matter is specifically incorporated by reference as if fully set forth herein. Alternatively, in some configurations the intensities measured by FPA 119 are not needed, instead using the demosaiced intensity sum from FPA 129 as described above.

In other configurations, FPA 119 is used for images a different wavelength or wavelengths, such as visible light or infrared light or other spectral region. In other configurations, some of the components shown may be omitted or changed in order. For example, in some configurations, the beamsplitter 123 may be replaced by another variety of polarizing plate or optic or for some instances, omitted altogether if the incident polarization state is of sufficient quality. In some configurations, the compensator 125 and/or imaging lens can be omitted. The bandpass filter 122 can also be omitted for suitable environments where background light can be neglected. Alternatively, the components 124 through 128 or some subset thereof can be repeated in other configurations between beamsplitter 123 and the FPA 119. The modulation patterns between FPA 119 and 129 can be the same or of different lengths or other differences in shape or structure, as described in the '895 patent. The signals obtained from either or both of the FPAs 119, 129 can be combined in algorithms described in the '895 patent.

Other techniques described in the '895 patent can be combined with a 3D camera incorporating any of the EOMs disclosed herein.

One or more of the EOMs, e.g., EOMs 10, 40, 50, disclosed herein can be included in a 3D imaging system as a modulator and/or compensator, for example, in a sensor subsystem or component thereof, or the like. For example, each of the disclosed EOMs may be included as a modulator and/or compensator in any of the 3D imaging systems disclosed in U.S. patent application Ser. No. 15/823,482, entitled "System and Method of Reducing Ambient Background Light in a Pulse-Illuminated Image," filed Nov. 27, 2017 ("'482 application"), which is incorporated by reference in its entirety as if fully set forth herein. A 3D imaging system may include more than one of the EOMs. In 3D imaging applications, the EOMs may be used as a light modulator to modulate the polarization of incident light, an optical gate, or the like. The controller, processor subsystem, processor or other control means of the 3D imaging system, such as any of those systems disclosed in the '482 application, may be configured to control the operation of the EOM, for example, by generating the voltage that is applied to the EOM electrodes. Example voltage ramps and signals that may be used are disclosed in the '482 application.

The disclosed EOMs may also be included in LIDAR systems for measuring distances to objects in a scene by illuminating those objects with a pulsed laser light and then measuring the reflected pulses with a sensor. Differences in laser return times can be used to make digital 3D-representations of the target scene. The LIDAR embodiments of 3D imaging systems are useful in automotive applications, particularly using one or more of the systems as a sensor on an autonomous vehicle to detect and sense objects and their positions around the vehicle. In such an application, one or more of the systems can be mounted on the vehicle to cover fields of view around the vehicle. The systems can detect objects and their positions around the vehicle in real-time as the vehicle moves along roadways and in traffic. The LIDAR embodiments of the systems may be useful for other applications, such as robotic vision, surveying, video game controls, visual effects, augmented-, mixed-, virtual-reality or similar, mapping, handheld devices such as cameras, smartphones, or the like, and other applications where it is useful to know coordinate or location information about areas of the real-world.

Additionally or alternatively, the 3D imaging systems and methods described herein, either expressly or by incorporation by reference, may include any of the compact illuminators and/or driver circuitry described in U.S. patent application Ser. No. 15/845,719 filed Dec. 18, 2017, entitled "Driver Circuit Usable for Supplying Pulsed Light Source" as illuminator(s) or light source(s). The subject matter of U.S. patent application Ser. No. 15/845,719 is hereby expressly incorporated by reference in its entirety as though set forth fully herein.

Additionally or alternatively, the pulse light source and methods described in U.S. patent application Ser. No. 14/696,793 filed Apr. 27, 2015, entitled "Method and System for Robust and Extended Illumination Waveforms for Depth Sensing in 3D Imaging" may be used with the 3D imaging systems and methods described herein, and the subject matter of that application is hereby expressly incorporated by reference in its entirety as though set forth fully herein.

Additionally or alternatively, the glint reduction methods, components and systems described in U.S. Provisional Patent Application 62/573,156 filed Oct. 16, 2017, entitled "System and Method for Glint Reduction," may be used and incorporated with the 3D imaging systems and methods described herein. Such 3D imaging system may include any of the EOMs disclosed herein as a modulator and/or compensator. The subject matter of U.S. Provisional Patent Application 62/573,156 is hereby expressly incorporated by reference in its entirety as though set forth fully herein.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially. In addition, while certain aspects of this disclosure are described as being performed by a single module or component for purposes of clarity, it should be understood that the functions described in this disclosure may be performed by any suitable combination of components or modules associated with an EOM or imaging system.

The foregoing description is illustrative and not restrictive. Although certain exemplary embodiments have been described, other embodiments, combinations and modifications involving the invention will occur readily to those of ordinary skill in the art in view of the foregoing teachings. Therefore, the invention is to be limited only by the following claims, which cover one or more of the disclosed embodiments, as well as all other such embodiments and modifications when viewed in conjunction with the above specification and accompanying drawings.

What is claimed is:

1. An electro-optic modulator having an optical axis, comprising:
   a first electro-optic material configured to receive light, the first electro-optic material having a first optic axis indicating a direction through the first electro-optic material along which a ray of light passing through the first electro-optic material experiences no birefringence, the first electro-optic material being positioned within the modulator so that the first optic axis is not parallel to the optical axis of the modulator;
   means for changing the polarization state of light output from the first electro-optic material to produce rotated light; and
   a second electro-optic material configured so that the rotated light passes through the second electro-optic material, the second electro-optic material having a second optic axis indicating a direction through the second electro-optic material along which a ray of light passing through the second electro-optic material experiences no birefringence, the second electro-optic material being positioned within the modulator so that the second optic axis is not parallel to the optical axis of the modulator.

2. The electro-optic modulator of claim 1, wherein the first electro-optic material and the second electro-optic material are positioned in the modulator so that the first optic axis and the second optic axis are each directed outside the field of view of the modulator.

3. The electro-optic modulator of claim 1, wherein the first optic axis is orthogonal to the optical axis of the modulator.

4. The electro-optic modulator of claim 1, wherein the second optic axis points in a direction opposite the first optic axis.

5. The electro-optic modulator of claim 1, wherein the thicknesses of the first electro-optic material and the second electro-optic material are about equal.

6. The electro-optic modulator of claim 1, wherein the thicknesses of the first electro-optic material and the second electro-optic material are both less than 10 mm.

7. The electro-optic modulator of claim 6, wherein the thicknesses of the first electro-optic material and the second electro-optic material are both less than 10 μm.

8. The electro-optic modulator of claim 1, wherein the first electro-optic material and the second electro-optic material are each a birefringent crystal.

9. The electro-optic modulator of claim 1, wherein at least one of the first electro-optic material and the second electro-optic material is selected from the group consisting of lithium niobate ($LiNbO_3$) and lithium tantalate ($LiTaO_3$).

10. The electro-optic modulator of claim 1, wherein the at least one of the first electro-optic material and the second electro-optic material is selected from a solid solution of lithium tantalate niobate $LiNb_xTa_{(1-x)}O_3$, where $0 \leq x \leq 1$.

11. The electro-optic modulator of claim 1, wherein at least one of the first electro-optic material and the second electro-optic material is KD*P.

12. The electro-optic modulator of claim 1, wherein at least one of the first electro-optic material and the second electro-optic material includes an isomorph of KDP or KD*P.

13. The electro-optic modulator of claim 1, wherein at least one of the first electro-optic material and the second electro-optic material includes a ferroelectric oxide.

14. The electro-optic modulator of claim 1, wherein at least one of the first electro-optic material and the second electro-optic material includes a semiconductor compound.

15. The electro-optic modulator of claim 1, wherein at least one of the first electro-optic material and the second electro-optic material includes a ferroelectric polymer.

16. The electro-optic modulator of claim 1, wherein the means for changing the polarization state of light output includes a half-wave plate.

17. The electro-optic modulator of claim 1, wherein the means for changing the polarization state of light output includes an optical rotator.

18. The electro-optic modulator of claim 1, wherein the means for changing the polarization state of light output includes a plurality of half-wave plates configured to provide a zero-order wave plate.

19. The electro-optic modulator of claim 1, wherein the means for changing the polarization state of light output includes the second electro-optic material rotated relative to the first electro-optic material so that the second electro-optic material functions as a half-wave plate.

20. The electro-optic modulator of claim 1, further comprising a plurality of electrodes configured to produce an electric field within the first electro-optic material and the second electro-optic material when a potential is applied between the electrodes, the electrodes being configured so that the electric field is generally transverse to the optical axis of the modulator.

21. An electro-optic modulator having an optical axis, comprising:
a first electro-optic material configured to receive light, the first electro-optic material having a first optic axis indicating a direction through the first electro-optic material along which a ray of light passing through the first electro-optic material experiences no birefringence, the first electro-optic material being positioned within the modulator so that the first optic axis is not parallel to the optical axis of the modulator;
first means for changing the polarization state of light output from the first electro-optic material to produce first rotated light;
a second electro-optic material configured so that the first rotated light passes through the second electro-optic material, the second electro-optic material having a second optic axis indicating a direction through the second electro-optic material along which a ray of light passing through the second electro-optic material experiences no birefringence, the second electro-optic material being positioned within the modulator so that the second optic axis is not parallel to the optical axis of the modulator;
a third electro-optic material configured to receive light output from the second electro-optic material, the third electro-optic material having a third optic axis indicating a direction through the third electro-optic material along which a ray of light passing through the third electro-optic material experiences no birefringence, the third electro-optic material being positioned within the modulator so that the third optic axis is not parallel to the optical axis of the modulator;
second means for changing the polarization state of light output from the third electro-optic material to produce second rotated light;
a fourth electro-optic material configured so that the second rotated light passes through the fourth electro-optic material, the fourth electro-optic material having a fourth optic axis indicating a direction through the fourth electro-optic material along which a ray of light passing through the fourth electro-optic material experiences no birefringence, the fourth electro-optic material being positioned within the modulator so that the fourth optic axis is not parallel to the optical axis of the modulator.

22. The electro-optic modulator of claim 21, wherein the first electro-optic material, the second electro-optic material, the third electro-optic material, and the fourth electro-optic material are positioned in the modulator so that the first optic axis, the second optic axis, the third optic axis, and the fourth optic axis are each directed outside the field of view of the modulator.

23. The electro-optic modulator of claim 21, wherein the first optic axis is orthogonal to the optical axis of the modulator, the second optic axis is orthogonal to the optical axis of the modulator, the third optic axis is orthogonal to the optical axis of the modulator, the fourth optic axis is orthogonal to the optical axis of the modulator, and wherein the second optic axis points in a direction opposite the first optic axis, and the third optic axis points in a direction opposite the fourth optic axis.

24. The electro-optic modulator of claim 21, wherein the thicknesses of the first electro-optic material, the second electro-optic material, the third electro-optic material, and the fourth electro-optic material are about equal.

25. The electro-optic modulator of claim 21, wherein the first electro-optic material, the second electro-optic material, the third electro-optic material, and the fourth electro-optic material are each selected from the group consisting of lithium niobate ($LiNbO_3$) and lithium tantalate ($LiTaO_3$).

26. The electro-optic modulator of claim 21, wherein at least one of the first electro-optic material, the second electro-optic material, the third electro-optic material, and the fourth electro-optic material is selected from the group consisting of lithium niobate ($LiNbO_3$) and lithium tantalate ($LiTaO_3$).

27. The electro-optic modulator of claim 21, at least one of the first electro-optic material, the second electro-optic material, the third electro-optic material, and the fourth electro-optic material is selected from a solid solution of lithium tantalate niobate $LiNb_xTa_{(1-x)}O_3$, where $0 \leq x \leq 1$.

28. The electro-optic modulator of claim 21, further comprising a plurality of electrodes configured to produce an electric field within the first electro-optic material, the second electro-optic material, the third electro-optic material, and the fourth electro-optic material when a potential is applied between the electrodes, the electrodes being configured so that the electric field is generally transverse to the optical axis of the modulator.

* * * * *